(12) United States Patent
Komai (10) Patent No.: US 8,430,610 B2
(45) Date of Patent: Apr. 30, 2013

(54) FLUTTERING PREVENTION DEVICE FOR WORKING MACHINE

(75) Inventor: Yasuhiro Komai, Aichi (JP)

(73) Assignee: NT Engineering Kabushiki Kaisha (JP)

( * ) Notice: Subject to any disclaimer, the term of this patent is extended or adjusted under 35 U.S.C. 154(b) by 1285 days.

(21) Appl. No.: 12/158,900

(22) PCT Filed: Jan. 26, 2007

(86) PCT No.: PCT/JP2007/051753
§ 371 (c)(1),
(2), (4) Date: Jun. 23, 2008

(87) PCT Pub. No.: WO2007/091484
PCT Pub. Date: Aug. 16, 2007

(65) Prior Publication Data
US 2009/0202313 A1 Aug. 13, 2009

(30) Foreign Application Priority Data
Feb. 9, 2006 (JP) ................. 2006-064858

(51) Int. Cl.
*B23B 29/02* (2006.01)

(52) U.S. Cl.
USPC .......... 409/141; 408/143; 188/378; 411/383; 411/424

(58) Field of Classification Search .......... 408/143; 409/141; 188/378, 379, 380; 411/383, 424, 411/900, 901
See application file for complete search history.

(56) References Cited

U.S. PATENT DOCUMENTS

| | | | |
|---|---|---|---|
| 3,643,546 A * | 2/1972 | Richter et al. | 409/141 |
| 6,553,876 B2 * | 4/2003 | Hochuli et al. | 82/147 |
| 6,619,165 B2 * | 9/2003 | Perkowski | 82/160 |
| 2003/0228199 A1 * | 12/2003 | Matsumoto et al. | 409/141 |

FOREIGN PATENT DOCUMENTS

| | | | |
|---|---|---|---|
| GB | 1051548 A | * | 12/1966 |
| JP | 00110325182 | | 11/1999 |
| JP | 2000052176 A | * | 2/2000 |
| JP | 2000107976 | | 4/2000 |
| JP | 20020079405 | | 3/2002 |
| JP | 2005074558 A | * | 3/2005 |
| SU | 258815 A | * | 7/1970 |

OTHER PUBLICATIONS

Abstract Translation—(1970). Soviet Union Publication No. 258815.*
JPO Machine Translation—Komai, Yasuhiko (2002). Japan Patent No. 2002079405A.*
JPO Machine Translation—Komine, Takeshi (2005). Japan Patent No. 2005074558A.*
JPO Machine Translation—Senzaki, Chikara (2000). Japan Patent No. 2000052176A.*
International Search Report dated Apr. 9, 2007.

* cited by examiner

*Primary Examiner* — Daniel Howell
*Assistant Examiner* — Michael Vitale
(74) *Attorney, Agent, or Firm* — Young Basile Halon & MacFarlane, PC (57) ABSTRACT

Chattering suppression apparatus (10) comprises multiple bolt members (24a through 24d) for mounting boring bar (20) in the spindle (18). Inside the main body configuring bolt members (24a through 24d), a damper chamber (34) is formed and, inside the damper chamber (34), a friction damper section (36) that suppresses the vibration energy that can cause chatters during machining operation of workpiece W, through sliding friction, is housed in the movable state.

2 Claims, 8 Drawing Sheets

FLUTTERING PREVENTION DEVICE FOR WORKING MACHINE

CROSS-REFERENCE TO RELATED APPLICATIONS

This application is related to and claims priority to Patent Cooperation Treaty Application Serial Number PCT/JP2007/051753, filed Jan. 26, 2007, entitled "Fluttering Prevention Device for Working Machine", and Japanese Patent Application No. 2006-064858, filed Feb. 9, 2006, entitled "Chattering Prevention Device of Working Machine".

TECHNICAL FIELD

The present invention relates to the chattering suppression apparatus that suppresses chattering marks on the workpiece generated by machining tools in machining processes.

BACKGROUND ART

Generally, various machine tools are used to machine the workpiece with a machining tool. For example, during boring operation, a boring tool equipped with a boring tool tip and installed in the rotary spindle of the machine tool which rotates the said boring tool at a high speed is fed along a preparatory hole so that a precise hole is drilled in the predetermined position along the machining diameter of the cutting edge.

In regular cases, the boring bar is made so-called stub boring future and used to boring a hole in workpieces such as connecting rods, so that it is relatively long and has a small diameter. This is to avoid interference with jigs for clamping the workpiece or interference with the shape of the boring hole itself. For this reason, the boring bar is subject to deflection caused by cutting resistance, resulting in chattering marks (including so-called regenerative chattering marks) on the workpiece.

The vibration suppression boring bar disclosed in patent document 1 is known to avoid this problem. The boring bar shown in patent document 1 features a dynamic damper and it has a blind hole in the center, in which a pipe magnet is inserted in a sliding state, which is filled with another rod-shaped magnet which repels to the said pipe magnet that is placed in the center of the pipe magnet at a certain gap.
Japanese Laid-open Patent Publication No.H03(1991)-86404

DISCLOSURE OF INVENTION

Figure 11:
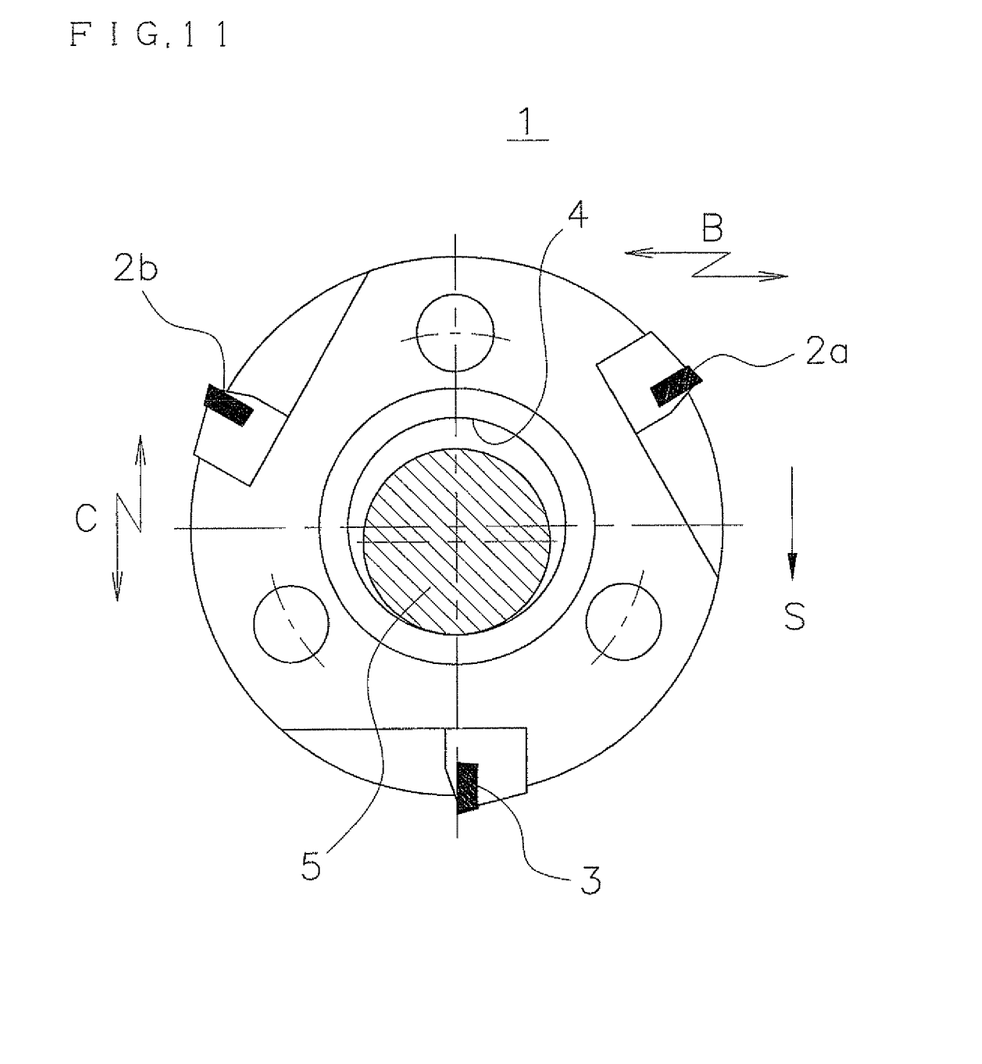
FIG. 11 is an explanatory drawing of the boring bar given in patent document 1.

If the vibration suppression boring bar specified in said patent document 1 is applied to boring bar 1 as shown in FIG. 11, which is designed for continuous semi-finish and finish processes, two semi-finish edges 2a and 2b and finish edge 3 are installed, equally spaced at a certain angle. Boring bar 1 is given center blind hole 4 where friction damper 5 is housed in a sliding state.

If in the above configuration the entire body of boring bar 1 moves toward the said finishing edge 3 (in the direction of arrow S) to adjust the diameter of finishing edge 3, friction damper 5 also moves slightly in the direction of arrow S. Accordingly friction damper 5 is dislocated from the center of boring bar 1, causing a centrifugal force to push against the internal hole in the direction of arrow S.

In this state, friction damper 5 functions against vibration working in the direction of arrow B while friction damper 5 does not work in the direction of arrow C. Friction damper 5 of this configuration has a vibration absorbing function in only a specific direction, so that it is inferior in view of general-purpose properties.

The present invention solves this problem by effectively suppressing chattering with a simple configuration and supplying a chattering suppression apparatus for working machines which can pursue precision machining work efficiently.

The present invention relates to a chattering suppression apparatus of working machines that suppresses chattering marks given on the workpiece caused by machining tools during machining processes. This chattering suppression apparatus comprises multiple bolt members for installing the machining tool on the spindle. The multiple bolt members have axial lines parallel to the axis of the said spindle.

The bolt member consists of the main body section having a thread section for screwing into the spindle, a damper chamber formed in the said main body section, and a friction damper section that absorbs the vibration energy, which causes chatters during workpiece machining operation, through sliding friction.

The head of the bolt member comprises a cap section for blocking the damper chamber. A gap for allowing vibrating the friction damper section should be formed inside the said damper chamber.

Further, the friction damper section should have a magnet that attracts the cap section.

Further, the magnet should be fixed to a weight, and the said weight should be housed inside the damper chamber so that it can vibrate in the axial direction and the direction perpendicular to the said axial direction.

In addition, three or more bolt members should be installed on the concentric circle around the rotary axis of the spindle.

The chattering suppression apparatus of the working machine related to the present invention houses a friction damper section in the movable state inside the bolt member for mounting the machining tool to the spindle side. For this reason, the friction damper section can be assembled in the desired layout and number without effects of the shape, etc. of the machining tool. With this feature, chattering can be effectively suppressed in a simple configuration and precision machining work can be pursued efficiently.

THE BEST MODE FOR CARRYING OUT THE INVENTION

Figure 1:
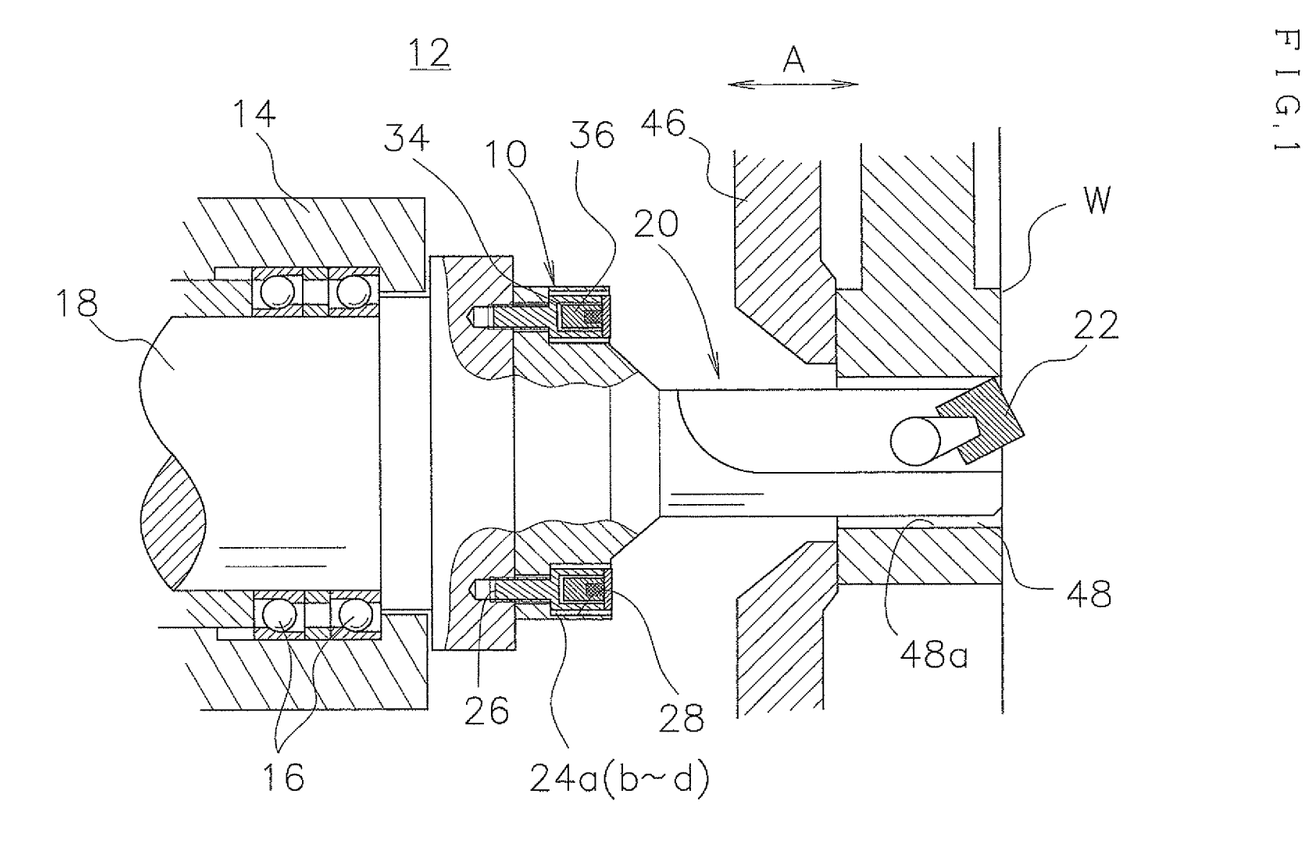
FIG. 1 is an explanatory drawing of the main part of the machine tool to which the chattering suppression apparatus of the working machine related to the first implementation style of the present invention is assembled.

FIG. 1 is an explanatory drawing of the main part of machine tool 12 to which chattering suppression apparatus 10 of the working machine related to the first implementation style of the present invention is assembled.

This machine tool 12 comprises spindle 18, which is installed inside casing 14 via bearing 16 in a state ready to rotate, and boring bar (machining tool) 20 that can be mounted to or removed from said spindle 18, and boring tool 22 is installed at the end of said boring bar 20.

Chattering suppression apparatus 10 comprises multiple bolt members, four for example, that is, 24a through 24d, having an axis parallel to the axial direction (direction of arrow A) of said spindle 18. Spindle 18 has four equally spaced threaded holes 26 on the concentric circle around the rotary axis, and boring bar 20 has four stepped holes 28 on the same concentric circle as that of said threaded holes 26.

Figure 2:
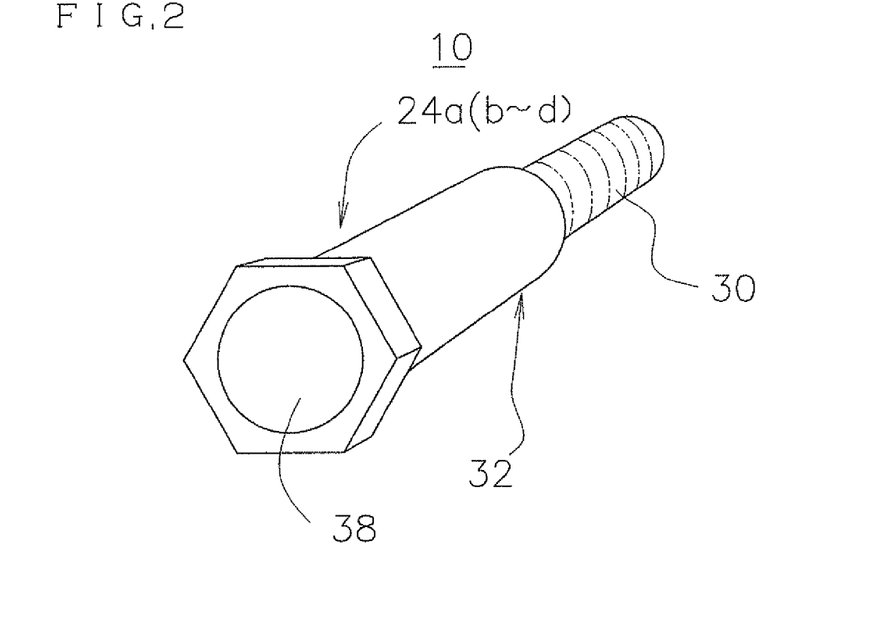
FIG. 2 is an odd-angle view of the bolt member comprising the said chattering suppression apparatus.
Figure 3:
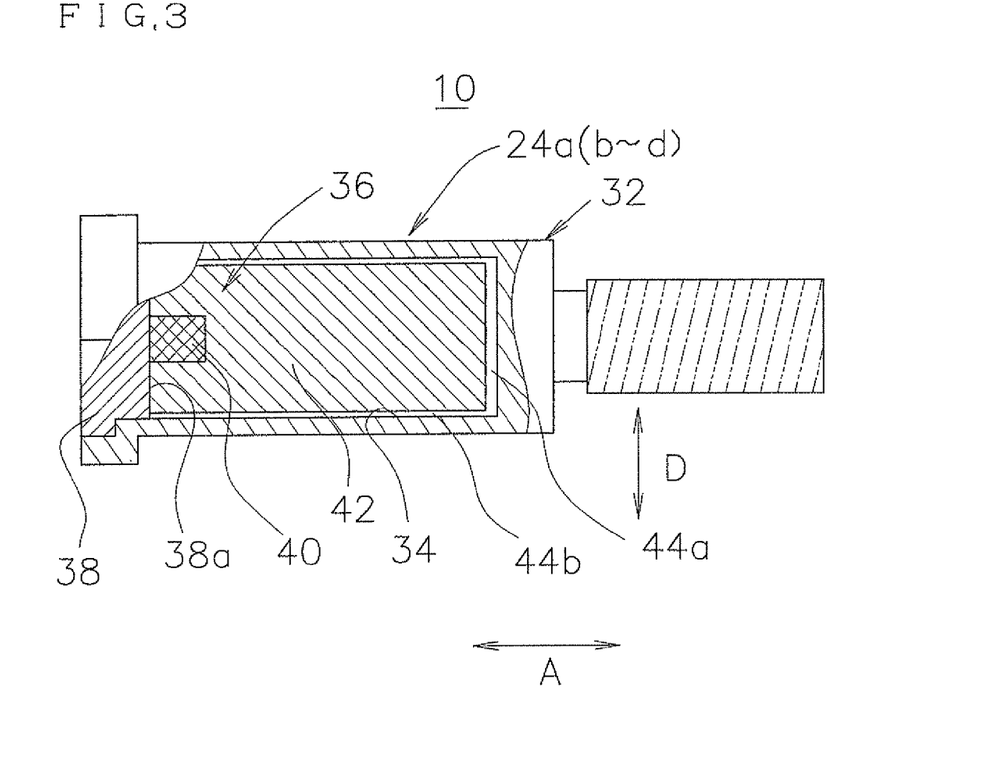
FIG. 3 is a cross sectional view of a part of the said bolt member.

As shown in FIGS. 2 and 3, each of bolt members 24a through 24d has main body section 32 having thread section 30 that is screwed into threaded hole 26 of spindle 18.

Inside main body section 32, damper chamber 34 is formed. Inside damper chamber 34, movable friction damper section 36 absorbs vibration energy, which causes chattering during workpiece machining operation, through sliding friction.

Magnetic cap section 38 for blocking damper chamber 34 is installed to the head section (for example, one corresponding to the hexagon head bolt) of bolt members 24a through 24d.

Friction damper section 36 comprises friction damper magnet 40, which attracts cap section 38, and weight 42 for fixing magnet 40. Because magnet 40 is exposed in standing vibration, the sliding face of magnet 40 should have resistance against friction and aging changes. Magnet 40 can be a general magnet or a vibration-resistant such as rare earth magnet. The internal face 38a of the cap that comprises cap section 38 and attracts magnet 40 is a smooth surface that allows said magnet 40 to slide smoothly.

Damper chamber 34 is provided with gap 44a for allowing weight 42 to vibrate (move) in the axial direction (in the direction of arrow A) and gap 44b for allowing said weight 42 to vibrate (move) in the direction (direction of arrow D) perpendicular to the said axial direction.

The motion of machine tool 12 to which chattering suppression apparatus 10 related to the first implementation style thus configured is described below.

As shown in FIG. 1, workpiece W is clamped in clamp apparatus 46. While spindle 18 of machine tool 12 rotates, boring bar 20 installed in the spindle is fed along preparatory hole 48 of the said workpiece W. Boring bar 20 moves toward preparatory hole 48 of workpiece W relatively. Boring bar 20 rotates while internal surface 48a configuring preparatory hole 48 is bored by boring tool 22 installed on boring bar 20.

Figure 4:
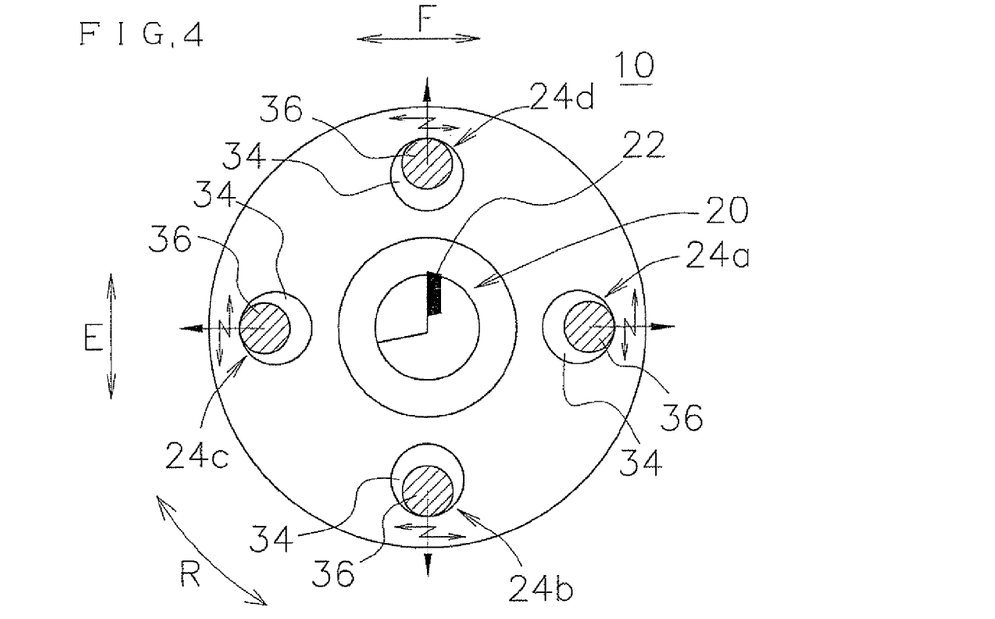
FIG. 4 is an explanatory drawing of operation of the said chattering suppression apparatus.

During the procedure, the centrifugal force of each of bolt members 24a through 24d, which function as bolts for mounting boring bar 20, works in the circumferential direction, as shown in FIG. 4. For this reason, the vibration suppression direction of each of bolt members 24a through 24d points in the perpendicular direction as shown with broken arrows at said bolt members 24a through 24d.

That is, bolt members 24a and 24c work for the vibration in the direction of arrow E, while bolt members 24b and 24d work for the vibration in the direction of arrow F. Further, for the vibration in the direction of arrow R, all bolt members 24a through 24d work.

In this way, radial arrangement of multiple bolt members 24a through 24d assures vibration suppression effects of some of said bolt members 24a through 24d. Therefore the force of vibration (kinetic energy) of boring bar 20 is converted into and dissipated with the lateral sliding friction energy caused by attraction force of magnets 40 that comprise bolt members 24a through 24d.

With the first implementation style, the new energy given to boring bar 20 is consumed and absorbed in the friction force of magnet 40, effectively suppressing chatters with a simple configuration.

In addition, friction damper section 36 of the first implementation style is housed in bolt members 24a through 24d functioning as bolts for mounting boring bar 20. For this reason, friction damper section 36 can be assembled at a desired arrangement in a desired number without relations to the shape, etc. of boring bar 20. Therefore chattering can be effectively suppressed with a simple configuration, thereby enabling efficient precision machining work.

While the amplitude of vibration is small, friction damper section 36 of chattering suppression apparatus 10 vibrates together with main body section 32 and cap section 38 as an integral body. On the other hand, if the amplitude of vibration becomes larger than a certain level, the inertial force caused on friction damper section 36 becomes larger than the friction force, causing a friction slide between friction damper section 36 and cap section 38 to absorb the vibration energy and suppress self-excited vibration (regenerative chattering), preventing the amplitude of vibration from becoming larger.

Figure 5:
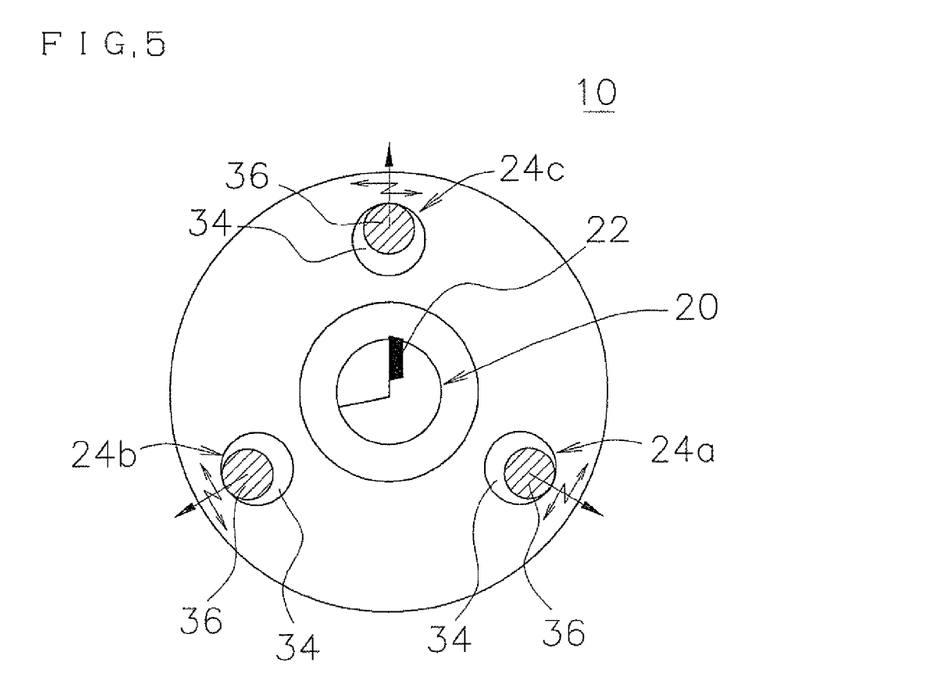
FIG. 5 is an explanatory drawing of operation with three bolt members.

Chattering suppression apparatus 10 related to the first implementation style comprises four bolt members 24a through 24d, but limitation is not set on this feature. For example, three equally spaced bolt members 24a through 24c can be provided on a concentric circle as shown in FIG. 5. Or five or more bolt members can be provided to increase the suppression effect, though illustrations are not drawn here.

Figure 6:
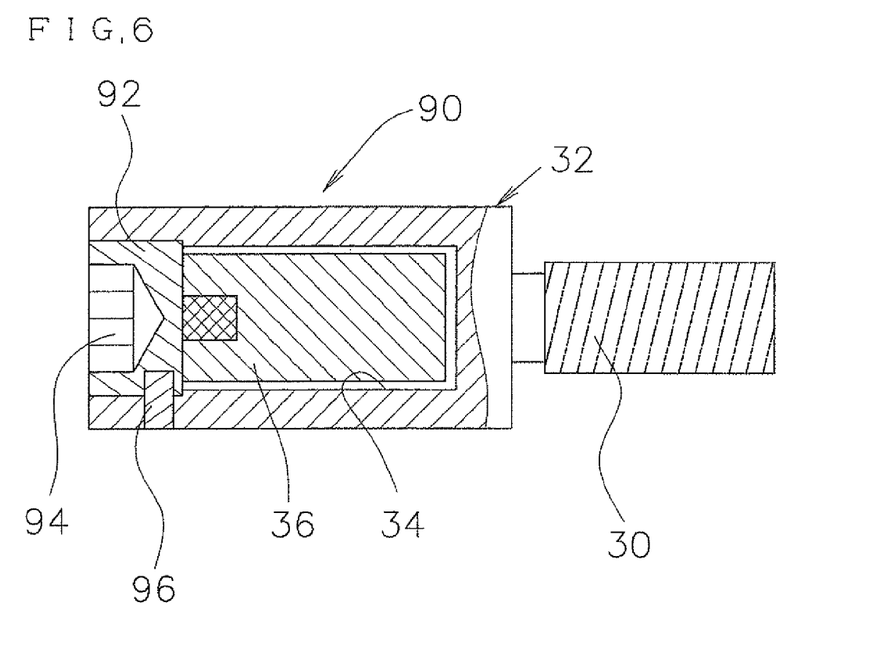
FIG. 6 is a cross sectional view of a part of the bolt member corresponding to the hexagon socket head cap screw.

In addition, bolt member 90 shown in FIG. 6 can be used in place of bolt members 24a through 24d corresponding to the hexagon head bolt. Components similar to bolt members 24a through 24d are given the same reference codes, detail description of which will be omitted.

Bolt member 90 corresponds to the hexagon socket head bolt and cap section 92, which is a magnetic body for blocking damper chamber 34, is provided with hexagon socket 94. Cap section 92 is locked to main body section 32 via lock pin 96.

Bolt member 90 has no projection out of main body section 32, so that interference with workpieces, jigs and so on not shown here can be avoided.

Figure 7:
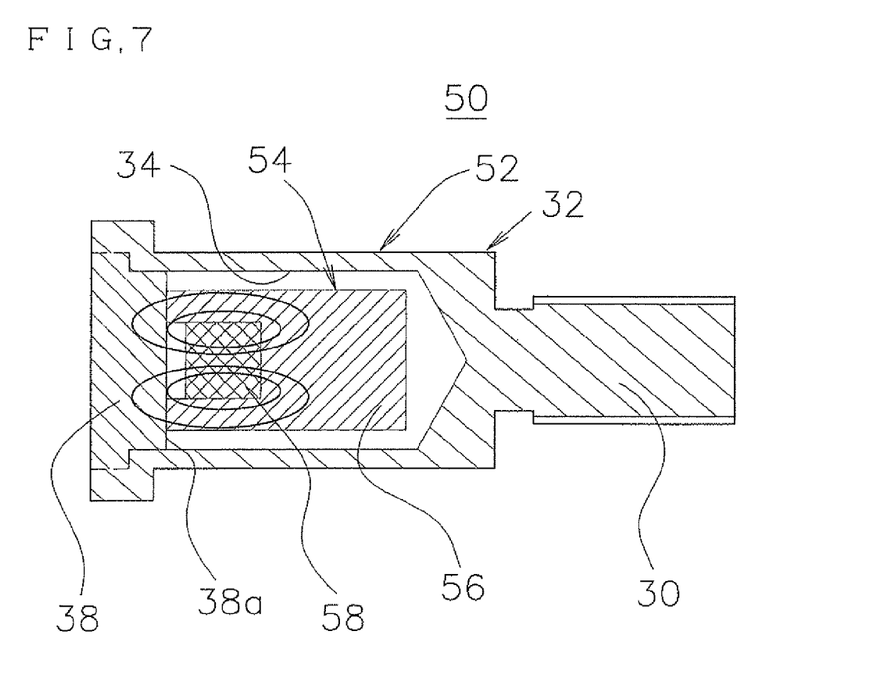
FIG. 7 is an explanatory cross sectional view of the chattering suppression apparatus of the working machine related to the second implementation style of the present invention.

FIG. 7 is an explanatory cross sectional view of chattering suppression apparatus 50 of the working machine related to the second implementation style of the present invention. Components similar to those of chattering suppression apparatus 10 related to the first implementation style are given the same reference codes, detail description of which will be omitted.

Chattering suppression apparatus 50 has multiple bolt members 52 and friction damper section 54 is housed in the damper chamber 34 configuring the said bolt member 52 in a movable state. Friction damper section 54 is provided with weight 56 made of a magnetic body such as steel and magnet 58 housed inside the surface of said weight 56.

With the second implementation style configured in this way, magnet 58 does not slide against the internal face 38a of cap member 38, thereby wear caused by friction of said magnet 58 can be avoided. In addition, the energy suppression and dissipation effects are larger with larger specific gravities oil weight 56, so that lead, copper, or cemented carbide may be used in addition to steel.

Figure 8:
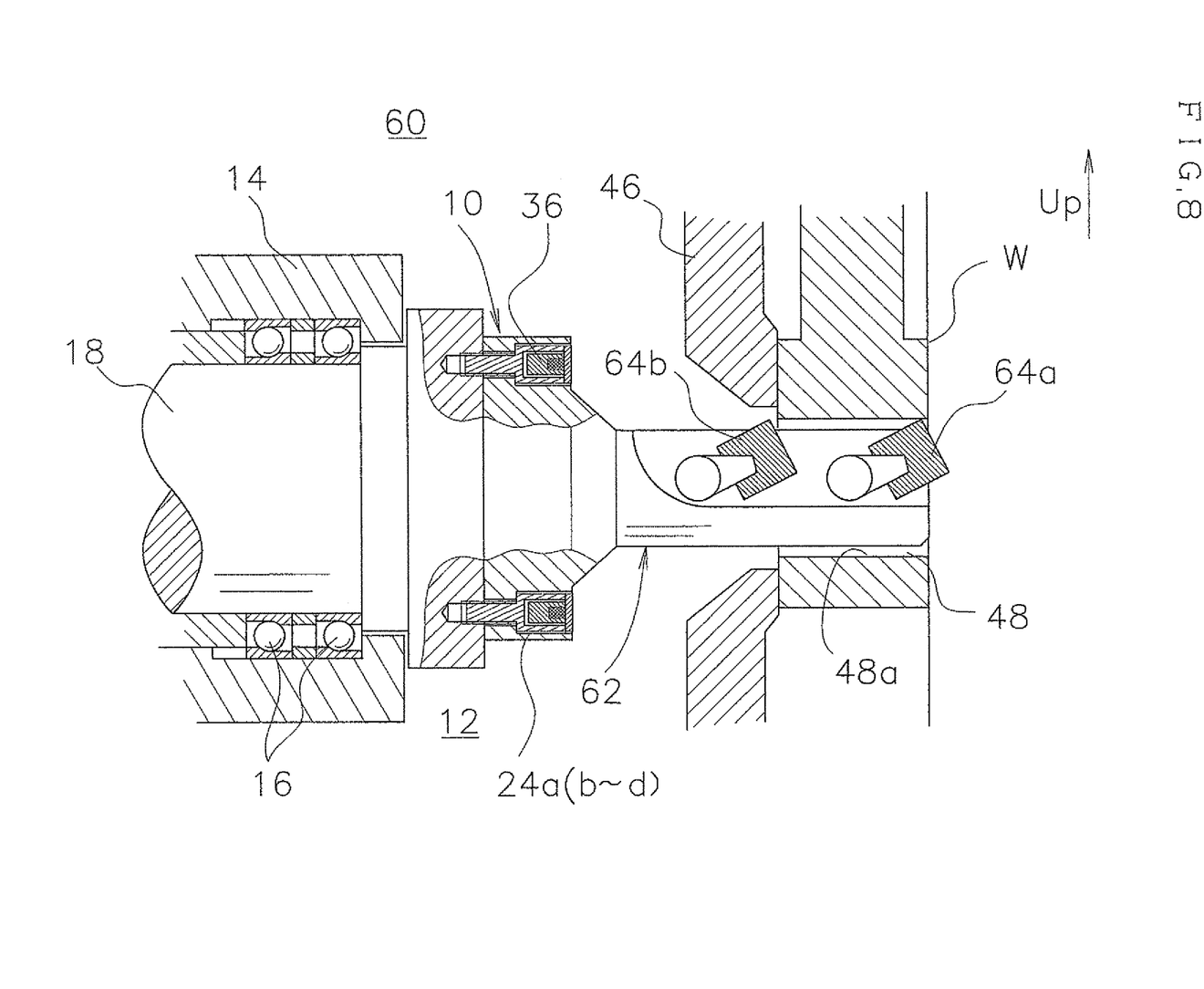
FIG. 8 is an explanatory drawing of the main part of the machine tool related to the third implementation style of the present invention.

FIG. 8 is an explanatory drawing of the main part of machine tool 60 related to the third implementation style of the present invention. Components similar to those of machine tool 12 related to die first implementation style are given the same reference codes, detail description of which will be omitted. In the fourth and fifth implementation styles described later, too, detail description will be omitted.

Machine tool 12 comprises boring bar (machining tool) 62 detachable to spindle 18. semi-finish boring tool 64a is installed at the end of this boring bar 62 and finish tool 64b is installed at the rear of the said semi-finish boring tool 64a.

In this way, semi-finish boring tool 64a and finish tool 64b are installed on boring bar 62, to which the chattering suppression structure cannot be installed.

The third implementation style houses friction damper section 36 in bolt members 24a through 25d functioning as bolts for mounting boring bar 62 to spindle 18. With this, friction damper section 36 can be assembled at a desired arrangement state in a desired number without being effected by the shape and other features of boring bar 62 easily, so that the same effects as those of said first and second implementation styles are obtained.

Machine tool 12 can be in die downward and upward machining orientations as well as in the horizontal orientation shown in FIG. 8.

Figure 9:
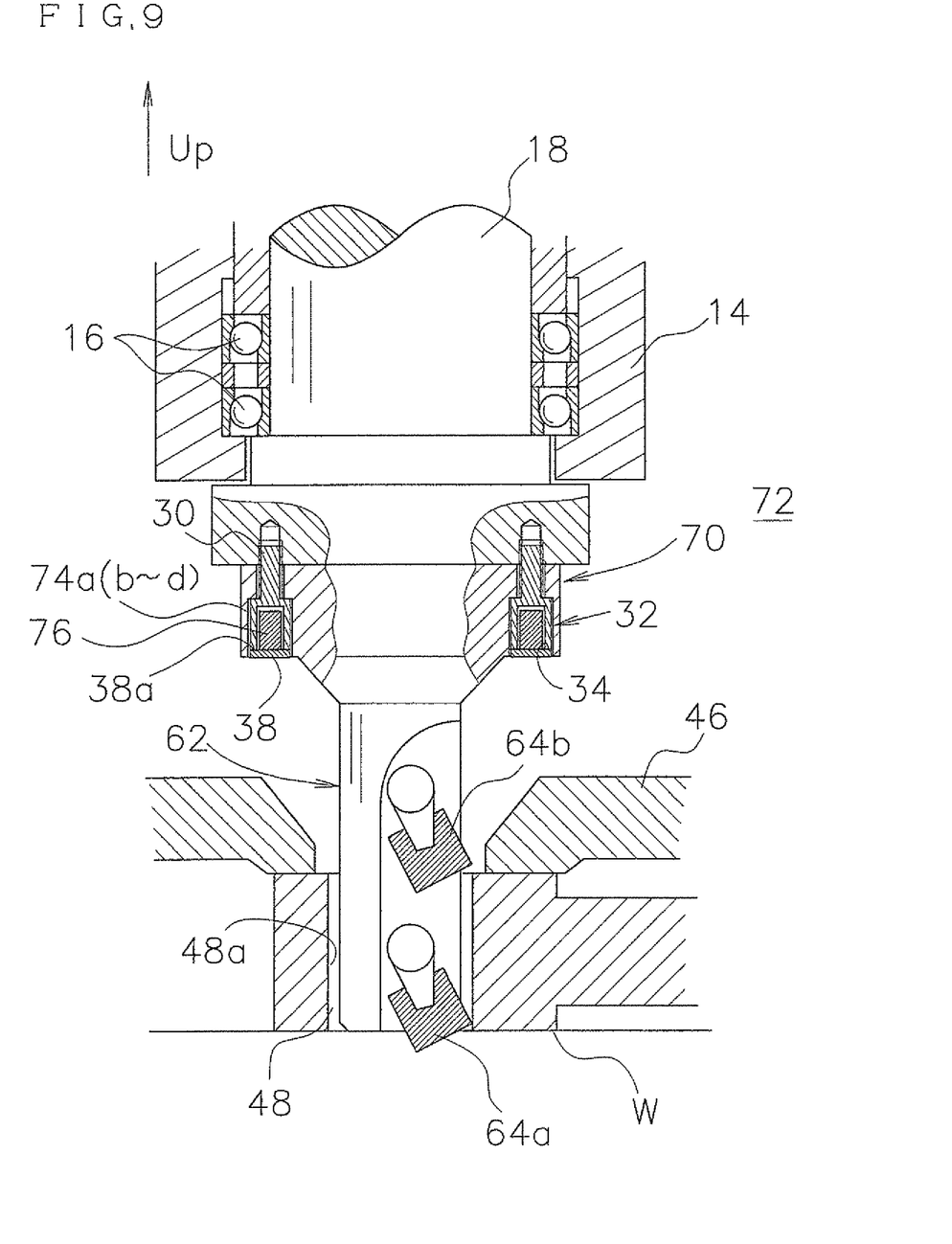
FIG. 9 is an explanatory drawing of the main part of the machine tool related to the fourth implementation style of the present invention.

FIG. 9 is an explanatory drawing of the main part of machine tool 72 to which chattering suppression apparatus 70 related to the fourth implementation style of the present invention is assembled.

Machine tool 72 is used in the downward machining orientation and chattering suppression apparatus 70 comprises, for example, four bolt members 74a through 74d. Friction damper section 76 is housed in damper chamber 34 configuring bolt members 74a through 74d in a movable state, and said friction damper section 76 is configured with merely a weight.

In the fourth implementation style thus configured, friction damper section (weight) 76 is placed directly against internal face 38a of the cap in the arbitrarily sliding state and the mass of the said friction damper section 76 itself and the gravity cause a sliding friction force. Accordingly the fourth implementation style does not use a magnet but achieves the effect similar to that of the first through third implementation styles described above.

Figure 10:
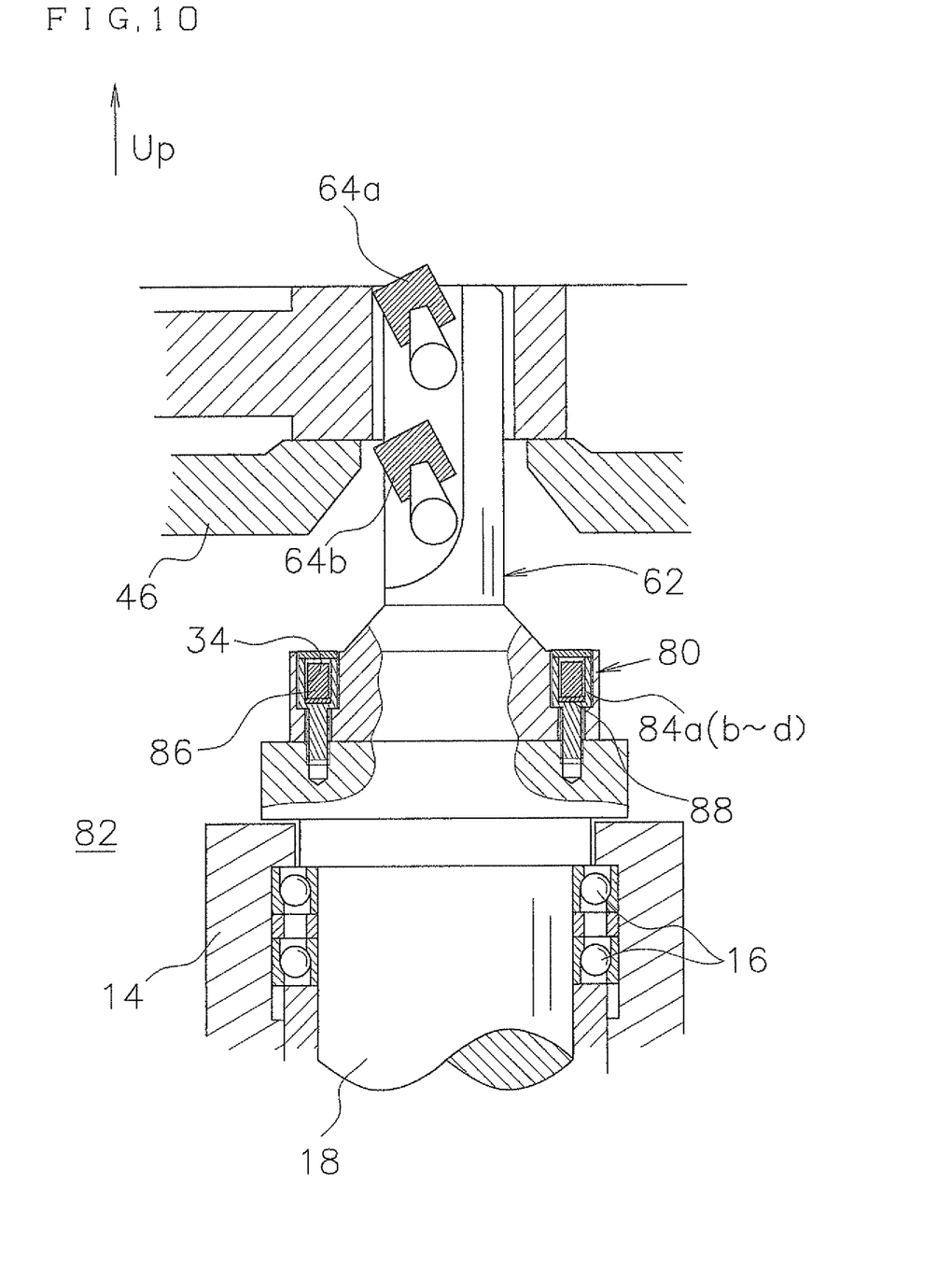
FIG. 10 is an explanatory drawing of the main part of machine tool 60 related to the fifth implementation style of the present invention.

FIG. 10 is an explanatory drawing of the main part of machine tool 82, to which chattering suppression apparatus 80 related to the fifth implementation style of the present invention is assembled.

Machine tool 82 operates in the upward machining orientation. Chattering suppression apparatus 80 comprises, for example, four bolt members 84a through 84d. In damper chamber 34 where bolt members 84a through 84d are configured, friction damper section 86 is housed in a movable state and said friction damper section 86 consists only of a weight. Spacer 88 should be installed inside damper chamber 34 so that friction damper section 86 is placed in the arbitrarily sliding state. This is to form a smooth sliding face.

In the fifth implementation style thus configured, friction damper section (weight) 86 is directly placed on spacer 88, and the mass of said friction damper section 86 itself and the gravity cause a sliding friction force. Accordingly the fifth implementation style does not use a magnet but achieves the effect similar to that of the first through fourth implementation styles described above, without a magnet.

Friction damper sections 76 and 86 are configured with only a weight in the fourth and fifth implementation styles described above. This case is not limited to those implementation styles but said friction damper sections 76 and 86 can be configured with a magnet only. In this case, friction damper sections 76 and 86 should be configured with a magnet having as large a specific gravity as possible.

The invention claimed is:

1. A chattering suppression apparatus of the working machine for suppressing chattering caused in machining processes by a machining tool that cuts a workpiece,
   which comprises multiple bolt members having an axis parallel to the axial direction of a spindle for mounting said machining tool in said spindle, and
   said bolt members comprising a main body section having a thread section for screwing into said spindle,
   a damper chamber formed inside said main body section,
   a friction damper section housed in said damper chamber in a movable state which absorbs vibration energy causing said chatters during said workpiece-machining operation through sliding friction,
   a cap section for blocking said damper chamber in a head of said bolt members, and
   a gap formed inside said damper chamber that allows vibration of said friction damper section, wherein said friction damper section contains a magnet attracting said cap section.

2. A chattering suppression apparatus of the working machine for suppressing chattering caused in machining processes by a machining tool that cuts a workpiece,
   which comprises multiple bolt members having an axis parallel to the axial direction of a spindle for mounting said machining tool in said spindle, and
   said bolt members comprising a main body section having a thread section for screwing into said spindle,
   a damper chamber formed inside said main body section,
   a friction damper section housed in said damper chamber in a movable state which absorbs vibration energy causing said chatters during said workpiece-machining operation through sliding friction,
   a cap section for blocking said damper chamber in a head of said bolt members, and a gap formed inside said damper chamber that allows vibration of said friction damper section, wherein said friction damper section contains a magnet attracting said cap section and said magnet is fixed to a weight housed inside said damper chamber in the vibrating state in said axial direction and in the direction crossing the said axial direction.

\* \* \* \* \*